United States Patent
Boscher et al.

(10) Patent No.: US 6,366,347 B1
(45) Date of Patent: Apr. 2, 2002

(54) INSTRUMENT FOR MEASURING THE NEAR-END CROSSTALK PER UNIT LENGTH OF MULTICORE FIBERS

(75) Inventors: Daniel Boscher, Trebeurden; Jean-Claude Bizeul, Louannec; Alain Leve, Perros Guirec, all of (FR)

(73) Assignee: France Telecom (FR)

( * ) Notice: Subject to any disclaimer, the term of this patent is extended or adjusted under 35 U.S.C. 154(b) by 0 days.

(21) Appl. No.: 09/384,362

(22) Filed: Aug. 26, 1999

(30) Foreign Application Priority Data

Aug. 27, 1998 (FR) .............................. 98 10768

(51) Int. Cl.[7] .............................................. G01N 21/00
(52) U.S. Cl. ...................................................... 356/73.1
(58) Field of Search ........................... 356/73.1; 385/49, 385/12, 43; 359/110, 121, 154; 250/227.14, 227.18

(56) References Cited

U.S. PATENT DOCUMENTS 4,295,739 A * 10/1981 Meltz et al.
4,309,105 A 1/1982 Lebduska
4,673,299 A * 6/1987 Dakin

FOREIGN PATENT DOCUMENTS

EP 605301 A 7/1994

* cited by examiner

*Primary Examiner*—Frank G. Font
*Assistant Examiner*—Tu T. Nguyen
(74) *Attorney, Agent, or Firm*—Blakely Sokoloff Taylor & Zafman

(57) ABSTRACT

The present invention relates to a system for measuring the optical coupling between cores of a multicore fiber which comprises transmitter capable of transmitting a train of pulses of controlled frequency and width into one end of a core of a multicore fiber, and detection capable of detecting the signal received at the same end of at least one other adjacent core of the multicore fiber, with a controlled time window close to the transmission pulse duration and with a delay between 0 and the transmission period.

7 Claims, 2 Drawing Sheets

INSTRUMENT FOR MEASURING THE NEAR-END CROSSTALK PER UNIT LENGTH OF MULTICORE FIBERS

BACKGROUND OF THE INVENTION

1. Field of the Invention

The present invention relates to the field of multicore optical fibers.

Even more specifically, the object of the present invention is to provide means of measuring optical coupling between the cores of a multicore fiber.

2. Description of the Prior Art

The concept of multicore fibers appeared in 1978, for multimode fiber applications. It was subsequently adopted in about 1986 for single-mode applications.

Further, in this kind of application, it would seem desirable to be able to accurately measure the coupled power, and the variation in coupled power, between the cores as a function of the length of the fiber.

Such a measurement would be of fundamental importance for specifications of transmission systems based on these multicore fibers. This is because it is essential to ensure that, in any installation, care is taken to keep the upper limits of the stray signal due to the inter-core coupling below an acceptable threshold.

However, to the inventors' knowledge, no system which performs well and is reliable has yet been proposed for this purpose.

It is generally accepted that the crosstalk is a decreasing function of the inter-core distance h and an increasing function of the mode diameter 2wo, it is also an increasing function of the fiber length when the ratio h/2wo>>1 and coupled-mode theory cannot then be applied. Until now, there has been no way of carrying out accurate analysis and measurement on a multicore fiber.

Another important object of the present invention is to provide means which permit reliable measurement without the need to section the fiber being tested.

SUMMARY OF THE INVENTION

The above objects are achieved in the context of the present invention using a system comprising transmitter means capable of transmitting a train of pulses of controlled frequency and width into one end of a core of a multicore fiber, and detection means capable of detecting the signal received at the same end of at least one other adjacent core of the multicore fiber, with a controlled time window close to the transmission pulse duration and with a delay between 0 and the transmission period.

According to another advantageous characteristic of the present invention, the processing means comprise means capable of adding, to the signal obtained at the detection means, a signal representative of the power lost by attenuation along the core placed in line with the detection means, in order to obtain the crosstalk.

According to yet another advantageous characteristic of the present invention, the processing means also comprise means capable of adding, to the crosstalk signal, a signal representative of the power lost by attenuation along the core placed in line with the transmitter means, in order to obtain the far-end crosstalk.

BRIEF DESCRIPTION OF THE DRAWINGS

Other characteristics, objects and advantages of the present invention will become apparent on reading the following detailed description and on studying the appended drawings, which are given by way of nonlimiting example and in which.

DETAILED DESCRIPTION OF THE PREFERRED EMBODIMENT

Figure 1:
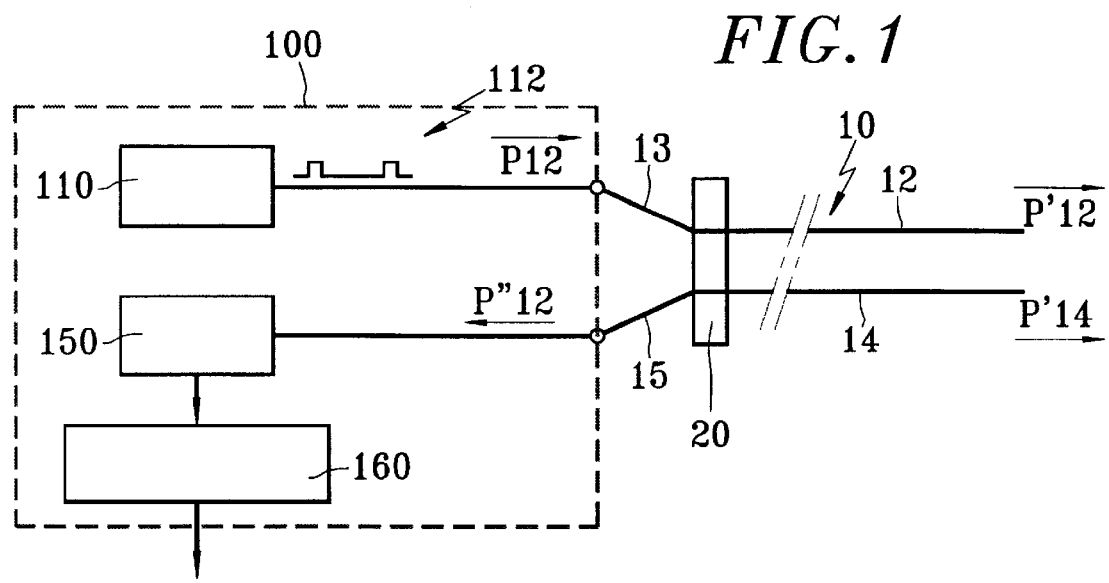
FIG. 1 schematically represents the overall structure of a system according to the present invention.

Appended FIG. 1 schematically represents the overall architecture of a system 100 according to the present invention.

This FIG. 1 shows two cores 12, 14 of a multicore fiber 10. At one end, these two cores 12 and 14 are isolated and separated by a spreader 20.

The system 100 according to the present invention comprises transmitter means 110, for example based on a laser, capable of transmitting a train of pulses 112 of controlled frequency and width into the end 13 of the core 12 accessible at the spreader, and detection means 150 capable of detecting the signal received at the same end 15 of the adjacent core 14 (or optionally several adjacent cores) of the multicore fiber. These detection means 150 are furthermore associated with processing and analysis means 160 which define a controlled reception time window close to the transmission pulse duration and with a delay between 0 and the transmission period, in order to make it possible to analyze the crosstalk and the far-end crosstalk.

The period Te in which the pulses are transmitted by the transmitter 110 must be longer than the time needed for these pulses to make the round trip in the fiber, i.e. Te is greater than 2 Dn/C, if D denotes the length of the fiber, n the core index and C the velocity of light in vacuo.

This system makes it possible to ascertain the coupled power at each point on the fiber and therefore to obtain the instantaneous coefficient of transfer per unit length all along the fiber. It thus makes it possible to detect inter-core distance variations, mode diameter variations and localized coupling which may be caused, for example, by unintentional curvatures.

By way of explanation, measuring the power received at the means 160 at a time t=2to after the transmission of a pulse makes it possible to determine the power coupled between the cores 12 and 14 at a distance from the origin of the fiber equal to the distance traveled by the light during the time to, i.e. at the distance Cto/n.

Figure 2:
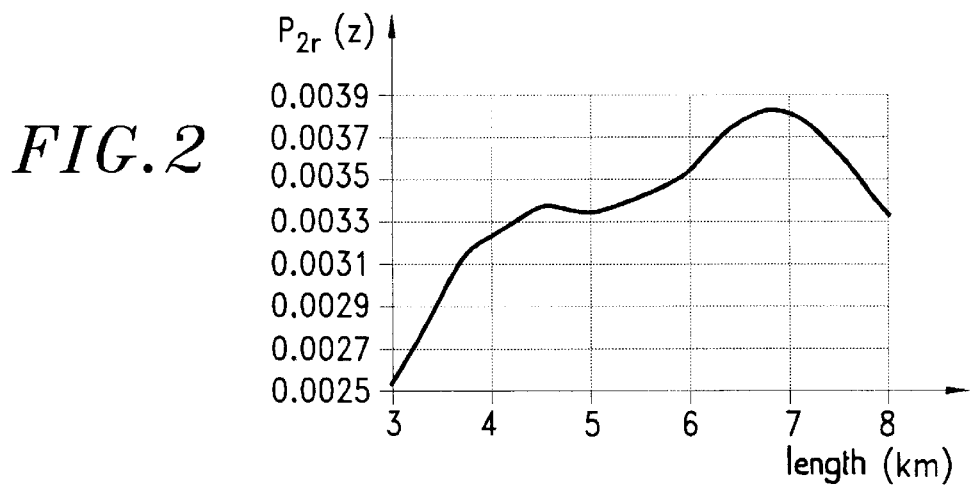
FIG. 2 represents a backscatter curve obtained using a system according to the present invention.

FIG. 2 illustrates an example of a backscatter curve obtained with a multicore fiber, using a measuring system according to the present invention. This FIG. 2 represents the power measured at the detection means 150.

Analyzing this curve makes it possible to obtain the variation in coupling along the fiber.

It can be seen that the curve obtained in this way differs fundamentally from the curves obtained in the context of conventional backscatter measurement on a single-mode fiber by launching laser pulses into one end of such a single-mode fiber and by detecting the backscattered flux at the output of this fiber, using a coupler.

Specifically, these conventional backscatter curves from a single-mode fiber, which correspond to ordinary attenuation measurements, have the appearance of a downward slope framed by two peaks.

Conversely, the backscatter curves obtained in the context of the present invention are in the general form of a "bell" as can be seen in FIG. 2.

On first approximation, presupposing in particular that the backscatter coefficient is constant along the fiber, it can be assumed that this curve satisfies the equation $P_{2r}(z) = ae^{-(\alpha 1 + \alpha 2)z}[(e^{(\alpha 1 - \alpha 2)z} - 1)/(\alpha 1 - \alpha 2)]$ i.e.

$P_{2r}(Z) = aze^{-2\alpha z}$ if it is assumed that all the cores involved have the same attenuation characteristics $\alpha(z)$, which ought to be checked, in particular, when said cores involved come from the same preform.

These equations are worked out on the basis of analyzing the path followed by the light. Firstly, a pulse is launched at the input of a first core 12. It then propagates along this core 12 at the velocity v=C/n. It will then undergo attenuation in the first core 12 during its propagation. Along the fiber, there is also coupling from the first core 12 into the second core 14. The light coupled into the second core 14 is then backscattered to the input of the second core 14, and thus undergoes attenuation in the second core 14 during its propagation.

In the above formulae, the following nomenclature is used:

$P_1(z)$ and $P_2(z)$ are the powers along the two cores 12 and 14, respectively, $\alpha 1(z)$ and $\alpha 2(z)$ are the attenuation coefficients in the cores 12 and 14, respectively, and $P_{2r}$ is the power measured by the backscatter instrument at the means 150.

The crosstalk corresponds to the ratio between the powers respectively obtained at the output of the core 14 and launched at the input of the core 12 (i.e. 10 log P'14/P12, referring to the values P'14 and P12 schematically referred to in FIG. 1).

The far-end crosstalk corresponds to the ratio between the powers obtained respectively at the output of the core 14 and at the output of the core 12 (i.e. 10 log P'14/P'12, referring to the values P'14 and P'12 schematically referred to in FIG. 1).

The near-end crosstalk corresponds to the ratio between the powers respectively launched at the input of the core 12 and obtained by backscattering at the input of the core 14 (i.e. 10 log P12/P"14, referring to the values P12 and P"14 schematically referred to in FIG. 1).

Figure 4:
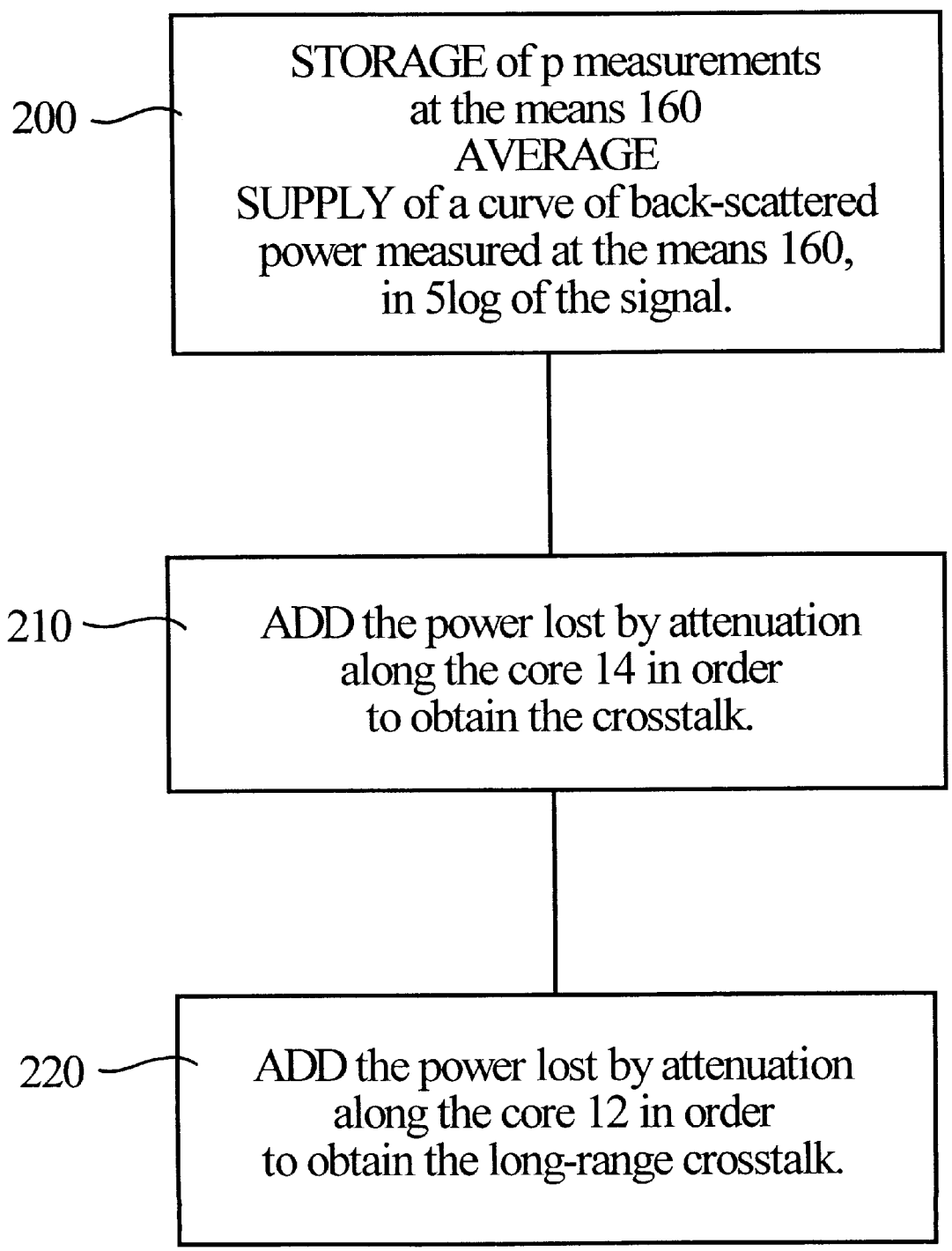

The processing sequence according to the present invention has been schematized in appended FIG. 4.

As can be seen at the step referenced 200 in FIG. 4, the means 160 firstly store the response curves detected at the means 150 following the successive pulse transmissions by the generator 110, take an average of these curves and thus supply a backscattered power curve measured at the means 150, of the type illustrated in FIG. 2. To that end, the means 160 preferably adopt a 5 log value of the signal received at the means 150 (5 log to take account of the round trip of the light, and not 10 log as is conventional in the acquisition electronics of attenuation measuring instruments). This signal represents in dB the backscattered power as a function of the length of the fiber, since the time at which an instantaneous power is detected directly defines the corresponding coupling distance over the fiber.

In order to obtain the crosstalk, the processing means 160 add, to the above signal, a signal representative of the power lost by attenuation along the core 14 placed in line with the detection means 150, as schematized in step 210 in FIG. 4.

To that end, it is sufficient to provide the instrument with a value representative of the attenuation $\alpha$ in the core. This value may be known and/or measured by any suitable means.

Further, in order to obtain the far-end crosstalk, the processing means 160 also add, to the crosstalk signal, a signal representative of the power lost by attenuation along the core 12 placed in line with the transmitter means 110, as schematized in step 220 in FIG. 4.

Figure 3:
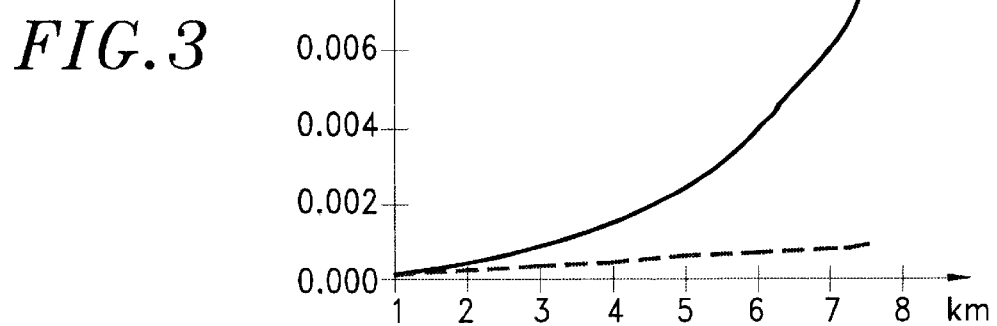
FIG. 3 represents the variation in the crosstalk and the far-end crosstalk obtained with a multicore fiber using the instrument according to the present invention, and FIG. 4 schematically represents the processing sequence employed in the context of the present invention.

FIG. 3 thus illustrates an example of curves of crosstalk (in dashes) and far-end crosstalk obtained along a multicore fiber, using a system according to the present invention. On these curves, the ordinate scale corresponds to a percentage of the launched power.

An overall linear variation in the power can be seen on these curves. Further, over long distances of multicore fibers placed end to end (typically in excess of about 18 km), it is possible to see changes of slope characteristic of variations in the intercore distance h from one fiber to another, and changes in level characteristic of a change in mode diameter.

The present invention is not of course limited to the particular embodiment which has just been described, but covers all variants in accordance with its spirit.

The present invention applies in particular to fibers with four cores. It is not, however, limited to this specific application and can be applied in general to any type of multicore fiber, for example to fibers with seven cores.

What is claimed is:

1. A system for measuring the optical coupling between separate cores of a multicore fiber, the system comprising:
    a transmitter means for transmitting a train of pulses of controlled frequency and width for a duration into a first end of a first core of a multicore fiber; and
    a detection means for detecting a signal received at a second end of a second core of the multicore fiber, said first end adjacent said second end, said system to utilize a controlled time window of approximately said duration with a delay of between about 0 and about the transmission period.

2. The system claimed in claim 1, which further comprises processing means which are associated with the detection means and which comprise means for adding, to the signal obtained at the detection means, a signal representative of the power lost by attenuation along the second core in order to obtain crosstalk.

3. The system claimed in claim 1, which further comprises processing means which are associated with the detection means and which also comprise means for adding, to a crosstalk signal, a signal representative of power lost by attenuation along the first core in order to obtain far-end crosstalk.

4. The system claimed in claim 1, which further comprises a spreader for separating portions of said first and second cores which are respectively placed in line with the transmitter means and the detection means.

5. The system claimed in claim 1, wherein said duration is longer than said transmission period.

6. The system claimed in claim 1, which further comprises:
    a means for storing response curves detected at the detection means following successive pulse transmissions by the transmitter means; and a means for taking an average of the response curves and supplying a backscattered power curve.

7. The system claimed in claim 1, which further comprises means for calculating a 5 log value of the signal received.

* * * * *